United States Patent [19]

Deex et al.

[11] 4,102,864
[45] Jul. 25, 1978

[54] POLYESTERS OF 1,2-BIS(HYDROXYPHENYL) ETHANES AND AROMATIC DICARBOXYLIC ACIDS

[75] Inventors: Oliver D. Deex, Clayton; Virgil W. Weiss, Chesterfield, both of Mo.

[73] Assignee: Monsanto Company, St. Louis, Mo.

[21] Appl. No.: 709,469

[22] Filed: Jul. 28, 1976

Related U.S. Application Data

[63] Continuation-in-part of Ser. No. 654,127, Feb. 2, 1976, abandoned, and Ser. No. 654,128, Feb. 2, 1976, abandoned.

[51] Int. Cl.$^2$ .............................................. C08G 63/18
[52] U.S. Cl. .............................. 528/173; 260/33.4 P; 260/DIG. 24; 528/193; 528/194; 528/176; 528/190; 528/125
[58] Field of Search ........................ 260/47 C, 49, 50

[56] References Cited

U.S. PATENT DOCUMENTS

| | | | |
|---|---|---|---|
| 3,028,364 | 4/1962 | Conix et al. | 260/47 |
| 3,160,602 | 12/1964 | Kantor et al. | 260/47 |
| 3,161,710 | 12/1964 | Turner | 264/216 |

*Primary Examiner*—Lester L. Lee
*Attorney, Agent, or Firm*—R. Bruce Blance; William J. Farrington; James C. Logomasini

[57] ABSTRACT

Polyester condensates of aromatic dicarboxylic acids and diphenols containing 1,2-bis(hydroxyphenyl)ethane in which the hydroxyl is in the 3 or 4 position.

The component acids are selected from the group consisting of isophthalic acid, terephthalic acid, 3,3'-, 3,4'- and 4,4'-bibenzoic acids, 1,3-, 1,4-, 1,5-, 1,6-, 1,7-, 1,8-, 2,6-, and 2,7-naphthalenedicarboxylic acids and acids represented by the formula:

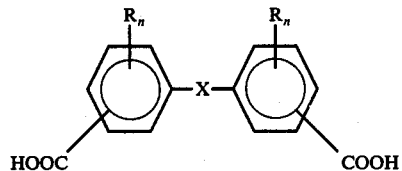

wherein the carboxyl groups are in the 3- or 4- positions, and X is O, S, $SO_2$, C=O, $CH_2$, $CH_2CH_2$, $CH(CH_3)$ or $C(CH_3)_2$.

The diphenol comprises 1,2-bis(hydroxyphenyl)ethane and optionally a diphenol selected from the group consisting of resorcinol, hydroquinone, 3,3'-, 3,4'- and 4,4'-diphenols, 1,3-, 1,4-, 1,5-, 1,6-, 1,7-, 1,8-, 2,6- and 2,7-dihydroxynaphthalenes and diphenols represented by the formula:

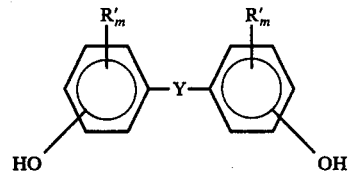

wherein the hydroxyl groups are in the 3- or 4- positions and Y is O, S, $SO_2$, C=O, $CH_2$, $CH(CH_3)$, $C(CH_3)_2$ or $(CH_2)_3$.

The aromatic polyesters have superior fire safety performance and are used for film, fiber and molding applications. Rapidly crystallizable polyesters may be obtained with superior solvent resistance and stress cracking resistance.

37 Claims, 1 Drawing Figure

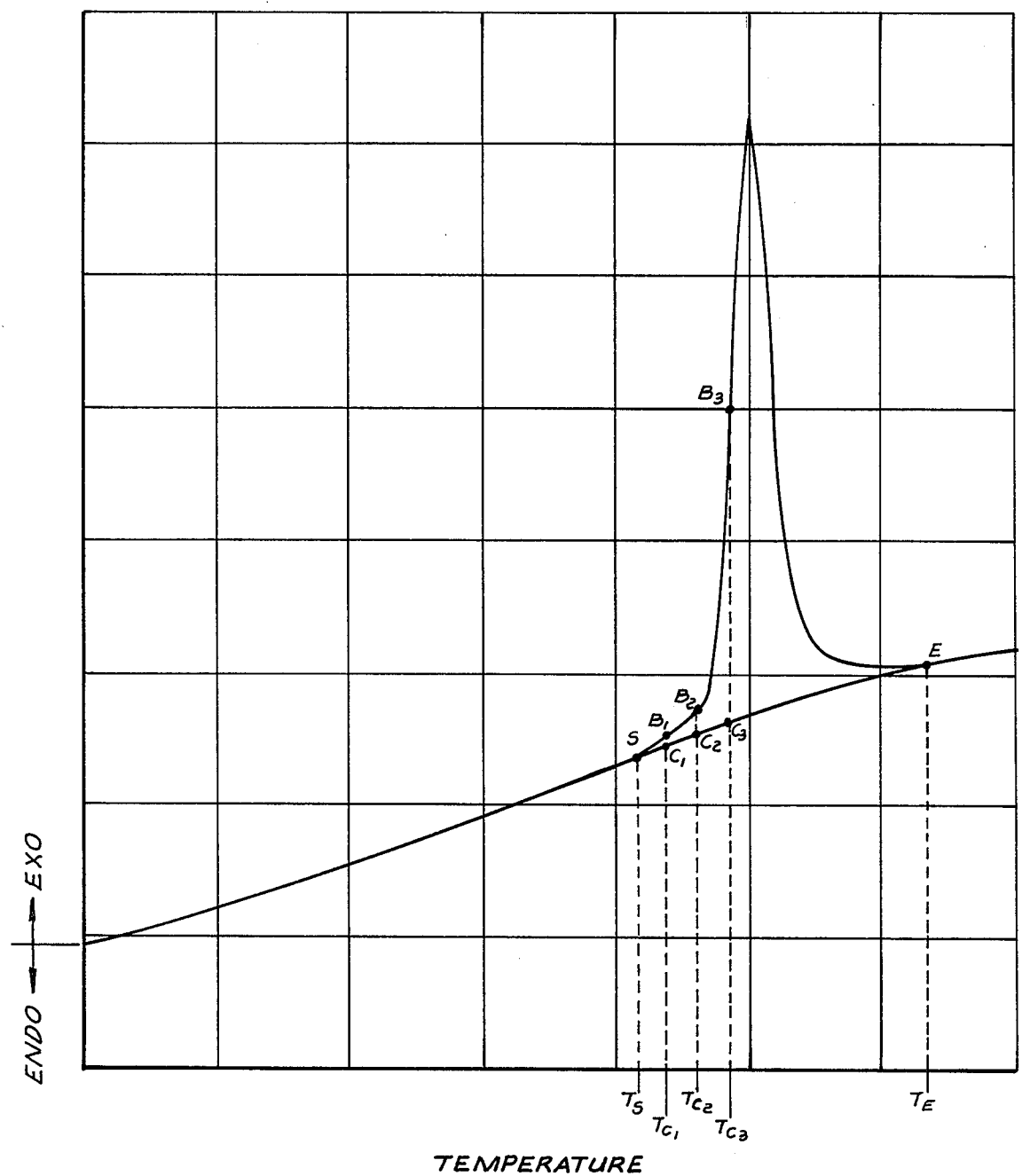

POLYESTERS OF 1,2-BIS(HYDROXYPHENYL) ETHANES AND AROMATIC DICARBOXYLIC ACIDS

This application is a continuation-in-part of application Ser. No. 654,127, filed Feb. 2, 1976 and now abandoned and application Ser. No. 654,128, filed Feb. 2, 1976 and now abandoned.

BACKGROUND OF THE INVENTION

1. Field of the Invention

This invention relates to a novel class of tractable linear aromatic polyesters of improved fire safety performance as well as to molding powders and shaped articles produced therefrom and is more particularly concerned with amorphous and crystalline polyesters comprising recurring units derived from 1,2-bis(hydroxyphenyl)ethanes and molding powders and shaped articles derived therefrom.

2. Description of the Prior Art

Many polyesters have been suggested for use as molding resins and engineering thermoplastics since the earliest practical development of such polymers by Whinfield and Dickson. Although several of such polyesters and copolyesters have found commercial success as film and fiber products, few have been successful as molding resins and engineering thermoplastics. Two of the more successful, polyethylene terephthalate and polytetramethylene terephthalate prepared from aliphatic diols and terephthalic acid, suffer from certain deficiencies as engineering thermoplastics. They are both quite flammable and have rather low glass transition temperatures which limit their usefulness to relatively low temperatures.

U.S. Pat. No. 3,160,602 discloses a process of forming polyesters by reaction of diphenol and aromatic carboxyl dihalide in solvent at temperatures of 270° C. or higher. The preferred polyesters are derived from hydroquinone and isophthalic acid and resorcinol and terephthalic acid and cocondensates where part of the hydroquinone or resorcinol is replaced by another dihydric phenol and part of the isophthalic or terephthalic acid has been replaced with another dicarboxylic acid. The patent suggests that the process might be used for the reaction of aromatic carboxyl dihalides and an extremely broad class of dihydric phenols of the general formula:

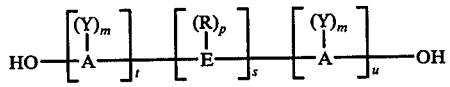

However, the instability of alkylene bridged diphenols at such high reaction temperatures in the presence of hydrogen halide would prevent the formation of polyesters of adequate molecular weight and acceptable color and indeed degradation of such polyesters under severe reaction conditions is recognized in Belgian Pat. No. 766,806 by the common assignee.

Drewitt and Lincoln, U.S. Pat. No. 2,595,343, teach a more satisfactory method of preparing polyesters from diphenols, by reacting the diacetates of the diphenols with dicarboxylic acids.

Polyesters prepared from diphenols and aromatic dicarboxylic acids are in general useful at higher temperatures because of their higher softening temperatures. However, unless they comprise flame retardants which yield toxic off-gases containing nitrogen, sulfur, phosphorus or halogen, they also are fairly flammable, particularly when they are in the form of thin sheets or filaments. Such polyesters include the polyesters of bisphenol A (2,2'-bis(4-hydroxyphenyl)propane) and of 1,1-bis(4-hydroxyphenyl)ethane. Moreover, many polyesters such as the polyesters of hydroquinone, 4,4'-dihydroxydiphenyl, bis(4-hydroxyphenyl)methane and the like have extremely high softening points often above 400° C. and are therefore thermally unstable in the melt, and impractical for conventional processing since they are intractable at conventional processing temperatures.

French Pat. No. 2,006,477 discloses new 1,4-dicarboxy-1,4-dialkylcyclohexanes and polymers prepared therefrom. Among the polymers, is a flammable polyester prepared from 1,2-bis (4-hydroxyphenyl)ethane and the alicyclic acid 1,4-dimethylcyclohexane 1,4-dicarboxylic acid. Kolesnikov et al disclose polycarbonates and mixed polycarbonates of 1,2-bis(4-hydroxyphenyl)ethane (Polymer Science A, USSR 9,764–773 (1967), but do not associate flame retarding properties with them.

A need, therefore, exists in the art for an engineering thermoplastic polyester which is flame retardant without addition of toxic flame retardant elements such as halogen and phosphorus and which has a relatively high glass transition temperature to allow it to be useful at temperatures above 100° C.

In a review of methylene bridged diphenol polyesters in Industrial and Engineering Chemistry (Vol. 51-1959 p. 147) Andre Conix, reported twenty-nine diphenol polyesters. Only two (bisphenol A terephthalate and bisphenol A/benzophenone-4, 4-dicarboxylic acid) were found to be crystalline while a third, amorphous (bisphenol A isophthalate) could be obtained from solution in a semi-crystalline state by a solution casting technique. The author recognized that the influence of chemical structure on physical behavior such as crystallinity is rather complicated and not easily predictable.

Conix, in U.S. Pat. No. 3,448,077 teaches that polyesters obtained from aromatic dicarboxylic acids and diphenols are amorphous but may be crystallized by heat treatment.

A need therefore exists for a polyester engineering thermoplastic which is relatively high melting to provide high temperature strength but not so high as to be intractable or degrade on melting and which is amorphous or is rapidly crystallized so that it can be molded on conventional molding equipment at rapid molding cycles.

A further need exists for a polyester engineering thermoplastic which contains a high degree of crystallinity for solvent and chemical resistance and for dimensional stability of molded or shaped articles.

A further need exists for a rapidly crystallizing, crystalline polyester engineering t ermoplastic which has improved fire safety performance without addition of toxic flame retardant elements such as nitrogen, sulfur, phosphorus or halogen.

SUMMARY OF THE INVENTION

A group of aromatic diphenol derived polyesters and copolyesters has now been discovered which possess a combination of strength, processability, high temperature performance and improved fire safety performance. This combination is achieved in polyesters comprising recurring units derived from 1,2-bis(hydroxyphenyl)ethane, in which the hydroxy groups are in the 3- or 4- positions. The aromatic polyesters are preferably prepared by reacting the aromatic dicarboxylic acids with the diacetate of a 1,2-bis(hydroxyphenyl)ethane or mixtures thereof, under conditions which allow acidolysis of the diacetate and removal of acetic acid. The component acids and diphenol or diphenol mixture are selected so that the melt viscosity of the polyester at 350° C. determined at a shear rate of 100 sec.$^{-1}$ with a capillary rheometer is less than about $10^5$ poise and preferably so that the glass transition temperature is greater than about 100° C. For aqequate strength, the inherent viscosity of the polyester is preferably at least about 0.3 determined at 30° C. at a concentration of 0.5 gram polyester per 100 ml. solution, in a mixed solvent containing 60 parts by weight of phenol and 40 parts by weight of sym-tetrachloroethane.

The component acids preferably comprise at least one acid selected from the group consisting of isophthalic acid, terephthalic acid, 5-alkyl-isophthalic acid wherein the alkyl radical contains from 1 to 6 carbon atoms, 3,3'-, 3,4'- and 4,4'-bibenzoic acids, 1,3-, 1,4-, 1,5-, 1,6-, 1,7-, 1,8-, 2,6- and 2,7-naphthalene dicarboxylic acids, and acids represented by the formula:

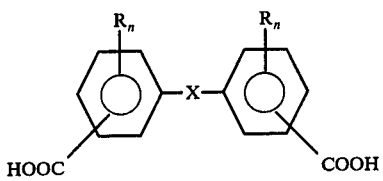

wherein the carboxyl groups are in the 3- or 4- position, X is O, S, SO$_2$, C=O, CH$_2$, CH$_2$CH$_2$, CH(CH$_3$) or C(CH$_3$)$_2$; R is H or a C$_1$ to C$_6$ alkyl radical, R groups ortho to a carboxyl are small enough to permit esterification, R substituents ortho to X are limited to one ring, and $n = 0$ to 2.

The diphenol comprises 1,2-bis(hydroxyphenyl)ethane and optionally a diphenol preferably selected from the group consisting of resorcinol, hydroquinone, 3,3'-, 3,4'- and 4,4'-diphenols, 1,3-, 1,4-, 1,5-, 1,6-, 1,7-, 1,8-, 2,6- and 2,7- dihydroxynaphthalenes, and diphenols represented by the formula:

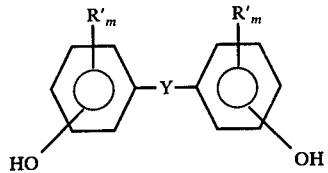

wherein the hydroxyl groups are in the 3- or 4- positions, Y is O, S, SO$_2$, C=O, CH$_2$, CH(CH$_3$), C(CH$_3$)$_2$, or (CH$_2$)$_3$; R' is H or a C$_1$ to C$_6$ alkyl radical, R' substituents ortho to Y are limited to one ring, R' substituents ortho to hydroxyl are small enough to permit esterification, and $m = 0$ to 4.

A preferred group of aromatic diphenol derived polyesters and copolyesters has also been discovered which possess a combination of strength, processability, high temperature performance, improved fire safety performance, crystallinity, a rapid rate of crystallization, and solvent resistance, and which impart dimensional stability to molded or shaped articles manufactured therefrom. This combination is achieved with polyester condensates of aromatic dicarboxylic acids and 1,2-bis(hydroxyphenyl)ethane in which the hydroxyl is in the 3 or 4 position or admixtures thereof. The component acids and diphenols are selected so that the melting point of the polyester is less than about 350° C. and preferably so that the glass transition temperature is greater than about 100° C.

The component acids of the more preferred, rapidly crystallizing polyesters comprise at least one acid selected from the group consisting of isophthalic acid, terephthalic acid, 3,3'-, 3,4'- and 4,4'-bibenzoic acids, 1,3-, 1,4-, 1,5-, 1,6-, 1,7-, 1,8-, 2,6- and 3,7- naphthalenedicarboxylic acids and acids represented by the formula:

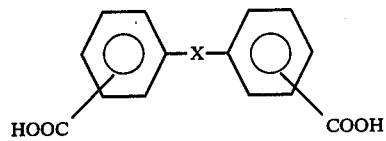

wherein the carboxyl groups are in the 3- or 4- positions, and X is O, S, SO$_2$, C=O, CH$_2$ or CH$_2$CH$_2$. The diphenol comprises 1,2-bis (hydroxyphenyl)ethane and optionally at least one diphenol selected from the group consisting of resorcinol, hydroquinone, 3,3'-, 3,4'- and 4,4'-diphenols, 1,3-, 1,4-, 1,5-, 1,6-, 1,7-, 1,8-, 2,6- and 2,7-dihydroxynaphthalenes and diphenols represented by the formula:

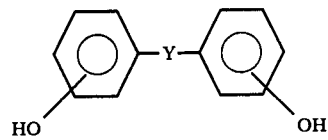

wherein the hydroxyl groups are in the 3- or 4- positions and Y is O, S, SO$_2$, C=O, CH$_2$, or (CH$_2$)$_3$.

The polyesters may be comminuted to form molding powders and are readily molded or extruded into useful articles with desirable properties particularly improved fire safety performance.

A feature of the present invention is the discovery that the aromatic polyesters of 1,2-bis(hydroxyphenyl)ethane have superior fire safety performance compared with other aromatic polyesters in the prior art. Thus, the polyisophthalate of 1,2-bis (4-hydroxyphenyl)ethane is superior to the polyisophthalate of 2,2-bis(4-hydroxyphenyl)propane (BPA) in flame resistance and degree of smoke generation on burning. It is therefore a feature of the present invention to provide sufficient 1,2-bis(hydroxyphenyl) ethane units in the aromatic polyester to obtain improved fire safety performance, the selection of dicarboxylic acids and diphenols being made so that the melt viscosity of the polyester at 350° C. determined at a shear rate of 100 sec.$^{-1}$ with a capillary rheometer is less than about $10^5$ poise and so that the glass transition temperature is preferably greater than about 100° C.

It is another feature of the invention that the crystalline aromatic polyesters of 1,2-bis(hydroxyphenyl)ethane crystallize rapidly so that they can be molded on conventional molding equipment in rapid molding cycles and provide solvent resistance and dimensional stability to molded or shaped articles manufactured therefrom. It is therefore a feature of a preferred embodiment of the present invention to select a combination of aromatic dicarboxylic acid and diphenol containing sufficient 1,2-bis (hydroxyphenyl)ethane to obtain a polyester having improved fire safety performance and crystallinity, the selection of the dicarboxylic acid diphenol combination being made so that the melting point of the polyester is below about 350° C. and the melt viscosity at 350° C. determined at a shear rate of 100 sec.$^{-1}$ with a capillary rheometer is less than $10^5$ poise to enable ready processing without degradation and so that the glass transition temperature is preferably above about 100° C. to provide a high service temperature.

THE PREFERRED EMBODIMENTS

The polyesters of the present invention can be produced by any convenient method such as by melt condensation or solvent condensation of mixtures of aromatic dicarboxylic acids and diphenol diesters selected to provide the desired fire safety performance and processability. They can be produced by melt or solution polymerization of selected mixtures of phenol esters of aromatic dicarboxylic acids and diphenols and by interfacial polymerization of salts of diphenols and aromatic dicarboxylic acid dihalides. Thus, while the combination is formally a condensate of diacid and diphenol, in practice the reactants are diacids and diphenol esters, or phenyl esters of diacids and diphenols, or salts of diphenols and diacid halides. The preferred method of preparation is the melt condensation of mixtures of aromatic dicarboxylic acids and diphenol diesters.

A suitable process for the production of the polyesters comprises reacting a mixture of a 1–7 carbon aliphatic monocarboxylic acid diester of the diphenols with at least one aromatic dicarboxylic acid in the melt phase and optionally in the presence of any of the catalysts which are conventionally used in such acidolyses such as alkali metal hydroxides, phosphates, carbonates or alkanoates, titanium dioxide, orthotitanates, and organotin compounds. In general, the alkali metal salts are the preferred catalysts. The catalyst may be used in amounts varying from 0.5 to 5.0 mol percent of the reactants. Preferably however, the amount of catalyst used is from 1.0 to 2.5 mol percent and more frequently is about 2 mol percent of the reactants. The reaction is carried out under an inert atmosphere substantially free of oxygen and under such conditions of temperature and pressure that the 1–7 carbon aliphatic monocarboxylic acid produced during the reaction is separated from the reaction mixture by distillation. The diphenol diesters useful in this melt condensation process include any of those of the relatively low-boiling monocarboxylic 1–7 carbon atom acids, such as acetic, propionic, butyric, pentanoic, hexanoic or heptanoic acids, or mixtures thereof, the most preferred being acetic acid.

In more detail the preferred polycondensation process conveniently comprises contacting a mixture of the 1–7 carbon atom aliphatic carboxylic acid esters of the diphenols with the aromatic dicarboxylic acid mixture such that the reactants are in substantially stoichiometric proportions up to 10 molar percent excess of the diester or the diacid, and in the presence of the catalyst. The reaction temperature is usually from 240° C. to 350° C. and the pressure is atmospheric or lower. Commonly the reaction is conducted under an inert atmosphere and in the initial phase at atmospheric pressure and subsequently at a higher temperature and at lower pressure or at a series of lower pressures until essentially all of the 1–7 carbon atom aliphatic carboxylic acid has been removed by distillation and the polyester product has achieved a high molecular weight. For adequate strength in the polyester, the molecular weight of the polyester is preferably sufficient to provide an inherent viscosity of at least about 0.3, preferably at least about 0.5, determined at 30° C. at a concentration of 0.5 gram per 100 ml. solution in a mixed solvent containing 60 parts by weight phenol and 40 parts by weight sym-tetrachloroethane.

1,2-bis(hydroxyphenyl)ethane can exist in several isomeric forms, depending on the position of the hydroxyl groups, such as the 4,4'-, 3,4'-, and 3,3'-isomers. For the purposes of this invention mixtures or blends of the 4,4'-isomers containing up to 25 percent or more of the 3,4'- and 3,3'-isomers can provide very useful polyester compositions within the scope of the invention. However, it is preferred to limit the amount of 3,4'- and 3,3'-isomers to about 10 mol percent, and the substantially pure 4,4'-isomer is frequently used.

While essentially any suitable aromatic dicarboxylic acid and admixtures thereof can be used in the practice of the invention, the preferred aromatic dicarboxylic acids comprise at least one acid selected from the group consisting of isophthalic acid, terephthalic acid, 5-alkylisophthalic acid wherein the alkyl radical contains from 1 to 6 carbon atoms, 3,3'-, 3,4'- and 4,4'-bibenzoic acids, 1,3-, 1,4-, 1,5-, 1,6-, 1,7-, 1,8-, 2,6- and 2,7-naphthalene dicarboxylic acids, and acids represented by the formula:

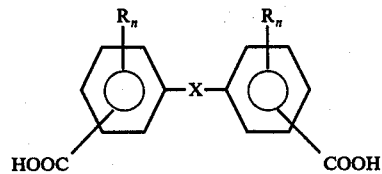

wherein the carboxyl groups are in the 3- or 4- positions, X is O, S, SO$_2$, C=O, CH$_2$, CH$_2$CH$_2$, CH(CH$_3$) or C(CH$_3$)$_2$, R is H or a C$_1$ to C$_6$ alkyl radical, R groups ortho to a carboxyl are small enough to permit esterification, R substituents ortho to X are limited to one ring and $n = 0$ to 2. A suitable aromatic dicarboxylic acid and admixture thereof is defined as an acid or mixture of acids which can be combined with 1,2-bis(hydroxyphenyl)ethane or 1,2-bis (hydroxyphenylethane in admixture with suitable diphenols to provide a polyester with the desired melt viscosity property and glass transition temperature as defined herein. The more preferred acids include isophthalic acid, terephthalic acid, 5-t-butylisophthalic acid, bis(4-carboxyphenyl)ether, bis(4-carboxyphenyl)sulfide, bis(4-carboxyphenyl)sulfone, bis(4-carboxyphenyl)methane, 1,2-bis (4-carboxyphenyl)ethane, and 2,2-bis(4-carboxyphenyl)propane since these acids and combinations of acids can be readily combined with diphenol combinations to provide polyesters with the desired melt viscosity property and glass transition temperature (T$_g$). Particularly preferred aromatic dicarboxylic acids are isophthalic and 5-t-butylisophthalic acids and combinations thereof. Mixtures of one or more of the diacids with minor quantities, generally less than about 25 mol percent, of C$_2$ to C$_{20}$ aliphatic diacids can also be used. The quantities of aliphatic diacids in general are selected so that they do not cause a significant loss in T$_g$ of the resulting polyesters. Preferably the quantity is limited to a loss in T$_g$ of not more than 10° C. The acid or admixture of acids is combined with 1,2-bis(4-hydroxyphenyl)ethane or with 1,2-bis (4-hydroxyphenyl)ethane in admixture with essentially any other suitable diphenol or mixture of diphenols to provide the aromatic polyesters of the present invention with the desired melt viscosity property and glass transition temperature. The preferred diphenols comprise at least one diphenol selected from the group consisting of resorcinol, hydroquinone, 3,3'-, 3,4'- and 4,4'-diphenols, 1,3-, 1,4-, 1,5-, 1,6-, 1,7-, 1,8-, 2,6- and 2,7-dihydroxynaphthalenes, and diphenols represented by the formula:

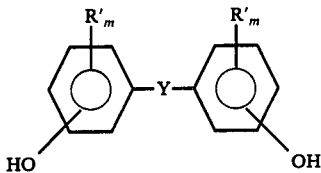

wherein the hydroxyl groups are in the 3- or 4- positions, Y is O, S, $SO_2$, C=O, $CH_2$, $CH(CH_3)$, $C(CH_3)_2$ or $(CH_2)_3$, R' is H or a $C_1$ to $C_6$ alkyl radical, R' substituents ortho to Y are limited to one ring, R' substituents ortho to hydroxyl are small enough to permit esterification, and $m = 0$ to 4. The preferred diphenols include bis(4-hydroxyphenyl)methane, 2,2-bis(4-hydroxyphenyl)propane, bis(4-hydroxyphenyl)ether, bis(4-hydroxyphenyl)sulfide and bis(4-hydroxyphenyl)sulfone and readily provide polyesters with the desired melt viscosity and glass transition temperature.

The glass transition temperature of the polyester is determined by differential scanning calorimetry with the Perkin-Elmer Model DSC-1B. The instrument is calibrated with respect to the differential temperature and average temperature as suggested in the Perkin-Elmer Instruction Manual. The sample size is in the range of 5 to 25 milligrams and the nitrogen flow is set at about 0.05 SCFH (1.42 liters per hour). The instrument is programmed to heat at the rate of 20° C. per minute. The mid-point of the $T_g$ discontinuity of the thermogram is taken as the glass transition temperature.

The fire safety performance of a polymer is manifested in several ways including the flame resistance or resistance to ignition and propagation of flame, the degree of smoke generation on combustion and the evolution of toxic gases on combustion. A polymer of improved fire safety performance is one which is difficult to ignite, does not readily propagate a flame, generates little smoke on combustion and evolves little of the more noxious gases containing nitrogen, sulfur, phosphorus or halogen which are very frequently a product of combustion of conventional flame retardant materials. Flame resistance is conveniently determined by the Underwriter's Laboratory "Test for Flammability of Plastic Materials — UL-94, September 17, 1973" using the ratings which became effective Feb. 1, 1974. Test samples conforming to specified dimensional limits are ignited, after which the igniting flame is removed and the time required for both the flame and any subsequent glowing to extinguish themselves is measured. The samples are classified in order of decreasing flammability as V-II, V-I or V-O, depending upon the burning and/or glowing time and whether or not the molten drippings from the sample will ignite cotton fibers placed below the sample. A rating of V-II indicates only that the solid polymer is self-extinguishing within an average time of 25 seconds, based on five trials, following removal of the igniting flame. The molten material which drips from the flaming sample may ignite untreated cotton fibers placed 12 inches (30 cm.) below the test sample. Samples which qualify as V-1 are self-extinguishing within an average time of 25 seconds following removal of the igniting flame and do not drip flaming molten material that ignites cotton placed 30 cm. below the test sample. Any localized glowing must cease within 60 seconds after the second removal of the test flame, not travel up the holding clamp and be incapable of igniting surgical cotton. If the other V-I requirements are met, the flame is extinguished within an average of 5 seconds following ignition, no flaming particles are present, and glowing ceases within 30 seconds after the second removal of the test flame, the samples are rated V-O. The appropriate Underwriter's Laboratory publications should be consulted for a more complete description of the rating system employed for the UL-94 test procedure. However, these numerical flame spread ratings are not intended to reflect hazards presented by such materials under actual fire conditions. Test samples are 15 cm. × 1.3 cm. and of three thicknesses approximately 0.32 cm., 0.16 cm. and 0.08 cm. and are held in a verticle position during test. The minimum sample thickness for a V-O or a V-I rating is determined in the test.

Other tests used for rating the fire-resistance of polymers include the oxygen index test determined in accordance with ASTM D-2863-70 and a variable flux test in which a sample of 0.16 cm. thickness is subjected to an ignition source of varying heat flux for varying times and the time for extinction of the flame is noted. Smoke generation is determined by the maximum specific optical density method described in ASTM Special Technical Publication 422 (1969) by D. Gross, J. J. Loftus, and F. A. Robertson, by means of the Aminco NBS Smoke Chamber, with samples of 0.08 cm. thickness. Surprisingly, the polyisophthalate of 1,2-bis(4-hydroxyphenyl)ethane, without any conventional flame retarding additives gives a flammability rating of V-O in a test with a sample of thickness 0.08 cm. or less. In contrast, glass filled poly(1,4-butylene terephthalate) does not meet the V-II rating at a thickness of 0.30 cm. and the polyisophthalate of 2,2-bis(4-hydroxyphenyl)propane does not meet the V-II rating at a thickness of 0.19 or less. In general, polymers exhibit higher ratings at greater thicknesses. Combinations of 1,2-bis(4-hydroxyphenyl)ethane and 2,2-bis(4-hydroxyphenyl)propane are intermediate between the extremes for the homopolymers. In addition to superior flame resistance, 1,2-(hydroxyphenyl)ethanes can yield aromatic polyesters which generate less smoke on combustion and no toxic off-gases containing nitrogen, sulphur, phosphorus or halogen. Thus, the aromatic polyesters of 1,2-bis(hydroxyphenyl)ethanes possess unexpectedly superior fire safety performance without the addition of conventional flame retardants and the introduction of 1,2-bis(-hydroxyphenyl)ethane into a polyester condensate of an aromatic dicarboxylic acid and a diphenol improves the fire safety performance of the polyester condensate in one or more aspects. While minor amounts of 1,2-bis(-hydroxyphenyl)ethane in the polyester condensate can give improvement in fire safety performance, it is preferred that at least 60 mol percent and even more preferably at least 75 mol percent of the recurring units of the polyester should be derived from 1,2-bis(hydroxyphenyl)ethane so that a more significant improvement in fire safety performance can be achieved.

In addition to providing improved fire safety performance, the combination of aromatic dicarboxylic acids and diphenol comprising 1,2-bis(hydroxyphenyl)ethane can be selected to influence the morphology of the polyester condensate and to provide polymers which are amorphous or crystalline, and tractable or intractable. The term amorphous is used in the conventional sense to mean that the polymer has a relatively low degree of molecular order, and is generally isotropic and optically transparent. In contrast, the term crystalline indicates that the polymer has a relatively high degree of molecular order and exhibits a sharp peak corresponding to a crystallization exotherm when a 10 mg. sample of melt in a nitrogen atmosphere is cooled at a rate of 20° C. per minute on a Perkin-Elmer differential scanning calimorimeter Model DSC-1B. Many of the polyester combinations may actually be crystallizable but difficult to crystallize, and can be maintained in a metastable amorphous state at temperatures in the range of ambient up to their glass transition temperature and even higher. The polymers are considered to be tractable if they soften or melt and flow at temperatures of 350° C. or less. The criterion for tractability or processability is the melt viscosity determined on a capillary rheometer at a shear rate of 100 sec.$^{-1}$. For adequate processability, the polyester combination of aromatic dicarboxylic acid or admixture thereof and 1,2-bis(hydroxyphenyl)ethane or admixtures thereof should be selected to provide a melt viscosity of less than about $10^5$ poise at 350° C. and preferably to provide a melt viscosity in the range of about $10^2$ to $10^5$ poise in the temperature range of 200° to 320° C. The combination is also preferably selected to provide a glass transition temperature above about 100° C. and more preferably above about 140° C. to provide a high service temperature for the polyester.

The novel 1,2-bis(hydroxyphenyl)ethane polyesters and copolyesters of the present invention are useful in many forms and can be shaped in many ways to produce useful objects. They can be cast into films of high strength either from the melt or from solution in suitable solvents such as mixtures of phenol and tetrachloroethane. Those which can be oriented under stress can be melt spun and drawn into fibers of good strength. They are very useful as molding resins for the production of molded articles. The novel polyesters are comminuted into powders or extruded and pelletized and the powders or pellets can be molded by extrusion into bar or rod form. They may be injection molded into any desired shape by conventional molding equipment and machines.

An injection molding procedure found suitable for the novel 1,2-bis(hydroxyphenyl)ethane polyesters involves the use of a screw fed injection molding machine wherein the stock is maintained at a suitable temperature to provide a melt viscosity suitable for molding and the mold is maintained at a temperature in the range of about 10° to 30° C. below the glass transition temperature and preferably about 20° C. below the glass transition temperature. Any other convenient injection molding and extrusion equipment and procedures can likewise be employed with the 1,2-bis(hydroxyphenyl)ethane polyesters and copolyesters described above.

For use as molding resins the novel polyesters can be blended with or can contain any of the commonly employed additives generally used with molding resins including waxes, lubricants, dyes, pigments, flame retardants, luster modifying agents and the like. Many such additives are known in the molding resin art. Their use in conjunction with the 1,2-bis(hydroxyphenyl)ethane polyester molding resins can provide advantageous results. For example, heat stabilizers can minimize degradation at higher temperatures and permit processing of the polyesters for longer periods at such temperatures.

In molding applications, the polyesters are preferably amorphous or rapidly crystallized so that they can be molded on conventional molding equipment in rapid molding cycles. Therefore, in preferred embodiments of the invention the bis(4-hydroxyphenyl)ethane and mixtures thereof and the aromatic dicarboxylic acid and mixtures thereof are selected to obtain the desired amorphous or rapidly crystallizing characteristics.

In the preferred embodiment of rapidly crystallizing polyesters, the polyesters of the present invention are prepared from any suitable aromatic dicarboxylic acid or mixture of acids which will yield upon condensation with 1,2-bis(hydroxyphenyl)ethane or diphenol mixtures containing 1,2-bis(hydroxyphenyl)ethane a rapidly crystallizing polyester which melts at a temperature less than about 350° C. The preferred acid comprises at least one acid selected from the group consisting of isophthalic acid, terephthalic acid, 3,3'-, 3,4'-, and 4,4'-bibenzoic acids, 1,3-, 1,4-, 1,5-, 1,6-, 1,7-, 1,8-, 2,6-, and 2,7- naphthalene dicarboxylic acids and acids represented by the formula:

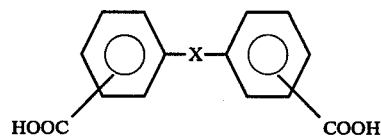

wherein the carboxyl groups are in the 3- or 4- positions, and X is O, S, $SO_2$, C=O, $CH_2$ or $CH_2CH_2$. The preferred acids include isophthalic acid, terephthalic acid, bis(4-carboxylphenyl)ether, bis(4-carboxyphenyl)sulfide, bis(4-carboxyphenyl)sulfone, bis(4-carboxyphenyl)methane, 1,2-bis(4-carboxyphenyl)ethane, and 2,2-bis(4-carboxyphenyl)propane since these acids and combinations of acids can be readily combined with diphenol combinations to provide polyesters with the desired melting point, glass-transition temperature ($T_g$) and crystallization rate. A particularly preferred aromatic dicarboxylic acid is isophthalic acid and combinations thereof. Mixtures of one or more of these diacids can also be used with minor quantities, generally less than about 25 mol percent of $C_2$ to $C_{20}$ aliphatic diacids and more preferably less than about 10 mol percent of $C_7$ to $C_{12}$ aliphatic diacids. The quantities of aliphatic diacids in general are selected to provide improved processability without significant loss in $T_g$ and melting point of the resulting polyesters. Preferably the quantity is limited to a loss in $T_g$ of not more than 10° C.

In the preferred embodiment of rapidly crystallizing polyesters, the polyesters are prepared from the aforementioned dicarboxylic acids and 1,2-bis(hydroxyphenyl)ethane optionally admixed with any suitable diphenol to provide a polyester which melts at a temperature of less than about 350° C. and crystallizes rapidly when it is cooled. The preferred optional diphenol comprises at least one diphenol selected from the group consisting of resorcinol, hydroquinone, 3,3'-, 3,4'- and 4,4'-diphenols, 1,3-, 1,4-, 1,5-, 1,6-, 1,7-, 1,8-, 2,6- and 2,7-dihydroxynaphthalenes and diphenols represented by the formula:

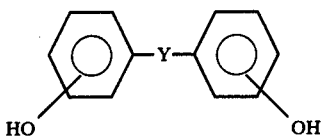

wherein the hydroxyl groups are in the 3- or 4- positions and Y is O, S, $SO_2$, $C=O$, $CH_2$ or $C(CH_3)_2$. The preferred diphenols include bis(4-hydroxyphenyl)methane, 2,2-bis(4-hydroxyphenyl)propane, bis(4-hydroxyphenyl)ether, bis(4-hydroxyphenyl)sulfide and bis(4-hydroxyphenyl)sulfone.

The more preferred rapidly crystallizing combinations of aromatic dicarboxylic acids and diphenols contain isophthalic acid as the major molar component of the acid moiety. In addition, in the preferred combinations, at least 75 mol percent of the diphenol moiety is 1,2-bis(4-hydroxyphenyl)ethane and more preferably at least 90 mol percent and even more preferably 95 to 100 mol percent. The preferences are based on the availability and cost of the acid and desirable glass transition and melting points of the resulting polyesters. Consequently, one of the more preferred combinations is obtained from isophthalic acid and 1,2-bis(4-hydroxyphenylethane without additional components. However, when mixtures of other aromatic diacids with isophthalic acid are used, up to 33 mol percent of such other diacid has little effect on the crystallization rate, although some alteration in the glass transition and melting point occurs. Similarly, when mixtures of 1,2-bis(4-hydroxyphenyl)ethane and other diphenols are combined with isophthalic acid, up to 10 mol percent of such other diphenol has little effect on the crystallization rate, although some alteration in glass transition and melting point occurs.

Since molding cycles are preferably rapid, it is desirable that a crystalline polyester crystallize in the short period during which the polymer is cooling in the mold. Thus a molding material for uses where high temperature dimensional stability is important, needs to have a rapid rate of crystallization. Rate of crystallization can be determined by means of differential scanning calorimetry and rates determined by this technique are used throughout this specification when a crystallization rate is given and are expressed as the inverse of the time required for one half of the crystallization exotherm observed when a sample is cooled at a rate of 20° C. per minute. The apparatus used in determining the crystallization rate is a DSC-1B Thermal Analyzer (made by Perkin-Elmer Corporation, Norwalk, Connecticut) and the method of using this apparatus is described in "Instructions, Differential Scanning Calorimeter" by Perkin-Elmer, Norwalk, Nov. 1966, pp. 7-9.

In the determination of the crystallization rate, the following procedure is used:

The instrument and recorder are turned on and set at the stand-by position and allowed to warm up for about a half hour. The instrument is then fully calibrated with respect to the differential temperature and average temperature as suggested in the Perkin-Elmer Instruction Manual. About 5 to 10 milligrams of the polymer sample is crimped in a non-hermetic pan and lid with the encapsulating tool, making sure that the bottom remains flat. An empty non-hermetic pan and lid are crimped in the same manner. The sample and the reference are placed in the right and left sensors of the DSC-1B. The sample cover is placed in position and the nitrogen flow is adjusted to about 0.05 SCFH (1.42 liters per hour). The range of the DSC-1B is set to 4 mcal per second, the scan rate to 10° C. per minute and the chart speed of the recorder to 2.54 cm. per minute. The "zero" of the instrument is adjusted so that the recorder pen is at a convenient position on the chart. The recorder is turned to "on" position and the baseline is recorded at room temperature. The green indicator light on the instrument is on indicating temperature control and the baseline recorded will be horizontal when thermal equilibrium is reached between sample and instrument. The program toggle switch is then placed in the increase position and the sample is scanned upwards to about 10° above the endothermic melting peak at the set rate of 10° C. per minute. The toggle switch is placed at the neutral position and let stay for two minutes. While the sample is held isothermal for two minutes, the scan rate dial is reset to 20° C. per minute and the recorder speed to 5.08 cm. per minute. The program toggle switch is placed in decrease position and the sample is cooled at the set rate of 20° C. per minute. The green indicator light of the instrument shows the temperature is in control. Exothermic crystallization peak (or peaks) should be seen on the recorder thermogram if crystallization occurs within the time interval of the scan. The scan is continued beyond the peak so that the baseline is re-established and the thermogram is complete. A typical exothermic crystallization peak is set forth in FIG. 1.

The baseline of the thermogram is interpolated on either side of the crystallization peak (or peaks). The baseline may show curvature due to the instrument. In that case, an appropriate French curve has to be used for interpolation. The point [S] at which the baseline first deviates to form the peak is determined and also the point [E] at which the peak (or final peak) finishes to rejoin the baseline. The former indicates the start, while the latter the end of the crystallization process. Perpendiculars are dropped from point [S] and point [E] to cut the temperature axis of the thermogram at $T_S$ and $T_E$ respectively. The total area [A] under the peak (or peaks) confined by [S] and [E] is measured with a planimeter. Area [A] is proportional to the heat of crystallization of the sample. The total time required for crystallization is given by:

$$\frac{T_S - T_E}{\text{cooling rate}} \text{ min.} = \frac{T_S - T_E}{20} \text{ min.}$$

The peak (or peaks) whose total area [A] has been measured, is sliced into several segments by dropping perpendiculars from different points $[B_i]$ on the peak (or peaks) to cut the interpolated baseline at $[C_i]$ and the temperature axis of the thermogram at 4° intervals $[T_{ci}$ etc.] The area [A'] of each segment $[SB_iC_i, SB_2C_2]$ is measured with a planimeter and the corresponding time of crystallization is calculated:

$$\frac{T_s - T_{c_i}}{\text{cooling rate}} \text{ min.} = \frac{T_s - T_{c_i}}{20} \text{ min. etc.}$$

The area of each segment is divided by the total area of the peak (or peaks) [A] and the results are expressed in percentages. The percent of crystallization peak area is plotted against crystallization time. The half time or the time at which [A'] is 50 percent of [A] is established from the graph. The rate of crystallization of the sample is the reciprocal of this "half time", e.g., if the half time is 5 minutes, the reciprocal is 0.2 min$^{-1}$.

The "rate of crystallization" or "crystallization rate" as used throughout this specification and claims is therefore understood to be that rate determined as set forth above on a DSC-1B Thermal Analyzer using a cooling rate of 20° C. per minute unless a different cooling rate is specified. A rate of crystallization of about 0.2 minutes$^{-1}$ or greater as determined by this method is satisfactory in injection molding of polymers because the cooling rate in the molding operation is generally much faster than the cooling rate used in the determination of rate of crystallization. However, a crystallization rate of about 0.5 minutes$^{-1}$ or greater is more preferable and for rapid molding cycles a crystallization rate of about one minute$^{-1}$ or greater is even more preferred.

In addition to selection of a combination of aromatic dicarboxylic acids and diphenols containing sufficient 1,2-bis(hydroxyphenyl)ethane to provide a rapidly crystallizing polyester and a melting point of less than about 350° C., the combination is preferably selected to provide a glass transition temperature of more than about 100° C. and preferably at least about 140° C. so that the polyester will display adequate resistance to stress both short and long term and dimensional stability at temperatures above about 100° C. and preferably at temperatures above 140° C. While the melting point should be less than about 350° C., it is preferably in the range of about 200° to 320° C. to provide the opportunity of creating filled polyesters with good strength at temperatures of 200° C. and higher. More preferably the melting point should be in the range of about 250° to 300° C. for high temperature strength without excessive thermal degradation in the melt.

The glass transition temperature and melting point of the polyester are determined by differential scanning calorimetry with the Perkin-Elmer Model DSC-1B. The instrument is calibrated, the sample and reference are prepared and the nitrogen flow rate is set in the same fashion as described for the determination of rate of crystallization. The instrument is programmed to heat at the rate of 20° C. per minute. The midpoint of the first discontinuity of the thermogram is taken as the glass transition temperature ($T_g$). The thermogram may show an exotherm of crystallization and at some 150° C. above the glass transition temperature, an endotherm of fusion is observed. The principal peak of the endotherm is taken as the melting point ($T_m$).

In addition to improved fire safety performance crystalline 1,2-bis(hydroxyphenyl)ethane polyesters of the present invention are outstanding in several particulars. For example the rate of crystallization of the most preferred poly(1,2-bis(hydroxyphenyl)ethane isophthalates can be faster than that of nylon 6, (polyepsiloncaprolactam) and polytetramethylene terephthalate.

The polyesters and copolyesters, in which the 1,2-bis(hydroxyphenyl)ethane is in the range of about 90 to about 100 mol percent of the diphenol moiety, possess melting points, usually in the range of 250°–320° C. and a high glass transition temperature or $T_g$ in the range of about 110° to 180° C. These properties confer high heat distortion temperature and creep resistance on the various shapes molded from these polyesters. The polyesters also possess high temperature stability as evidenced by thermogravimetric analysis which demonstrates that no appreciable weight loss occurs until temperatures exceed 450° C.

The crystalline polyesters of the invention have been found to possess excellent resistance to chemical attack. They demonstrate negligible weight loss after prolonged exposure to nonpolar and medium polarity solvents such as hexane, trichloroethane, acetone and methylethyl ketone. They resist attack by acids, bases and water. Likewise, they do not demonstrate environmental stress cracking when exposed as molded samples to these solvents. The moisture absorption of the 1,2-bis(hydroxyphenyl)ethane is generally low, for example the moisture absorption of poly(1,2-bis(4-hydroxyphenyl)ethane isophthalate) is from about 0.2 to 0.3 weight percent even for low molecular weight samples.

This invention is further illustrated but is not intended to be limited by the following examples in which ratios of monomers are mol ratios and all other parts and percentages are by weight, unless otherwise specified.

The Examples illustrate the preparation and unexpected properties of the 1,2-bis(hydroxyphenyl)ethane polyesters of this invention. All inherent viscosities are determined at 30° C. at a concentration of 0.5 g. per 100 ml. in a mixed solvent system of phenol and sym-tetrachloroethane containing 60 parts by weight of phenol. The morphology and fire safety performance of the polymers is determined by the methods described above.

The stress cracking properties of the polyesters are measured according to a specially devised test procedure in which a sample strip of dimensions 6 mm × 24 mm is cut from a 0.8 mm thick film of the polymer. This strip is doubled over and the ends are stapled together so that the center portion is under mild stress. This doubled and stapled strip is weighed and immersed in the test solvent and the state of the sample is observed immediately and every 24 hours therafter up to 3 days. The amount of solvent absorbed is determined by weighing the samples at intervals of 1 day, 4 days and 16 days. In extreme cases the sample has no stress cracking resistance and breaks immediately. Such tests are reported as "fail". In less extreme cases failure occurs after a number of days and this is indicated as such in Table 3. In less severe cases crazing is observed but no further change occurs. Such test results are reported as "crazed". Some samples, however, show neither failure nor crazing after the test has been concluded and such are marked as "pass". These are invariably the crystalline polyesters of the present invention.

EXAMPLE 1

PREPARATION OF POLY(1,2-BIS(4-HYDROXYPHENYL)ETHANE ISOPHTHALATE

A charge consisting of 8.2 parts of isophthalic acid and 14.8 parts of 1,2-bis(4-acetoxyphenyl)ethane is placed in a reaction vessel equipped with a stirrer, condenser and receiver. The vessel is evacuated and purged with nitrogen three times. A nitrogen blanket is maintained in the reactor while it is heated to 250° C. for about three hours during which period approximately 3.5 to 4.0 parts of acetic acid distills. Thereupon the vessel is evacuated to a pressure of about 125 mm. and heating at 275° C. is continued for one half hour during which period an additional 1 to 1.5 parts of acetic acid distills. The vacuum is then increased to reduce the pressure to about 0.1 to 0.2 mm. and the temperature is raised to 290° C. for an additional hour. At this point the reaction mixture becomes so viscous that further stirring is difficult. Heating is stopped, the reaction mixture is again blanketed with nitrogen and allowed to cool. The resultant polymer is light yellow in color, crystalline and demonstrates an inherent viscosity of 0.57 in the phenol-tetrachloroethane solvent.

morphology of the particular polyester. The compositions and physical property date are set forth in Table 1. Polyesters of bis(4-hydroxyphenyl)methane, 2,2-bis(4-hydroxyphenyl) propane and 1,3-bis(4-hydroxyphenyl)propane are set forth for purposes of comparison. Melt viscosities are determined at 316° C. with a Sieglaff-McKelvey Rheometer at a shear rate of 100 sec$^{-1}$, using a capillary with a length to diameter ratio of 25 to 1.

TABLE 1
COMPOSITION AND PHYSICAL PROPERTIES OF POLYISOPHTHALATES

| Example | Diphenol Composition Mol Ratio | Inherent Viscosity | Tractability | $T_g$ °C. | Melt Viscosity, poise, 100 sec$^{-1}$, 316° C. |
|---|---|---|---|---|---|
| 3 | BHPE | 0.96 | T | 140 | — |
| 4 | BHPE | 0.94 | T | — | $1.8 \times 10^4$ |
| 5 | BHPE | 0.62 | T | — | $1.8 \times 10^3$ |
| 6 | BHPE | 0.5 | T | — | — |
| 7 | BHPE/BPA 90   10 | 0.94 | T | — | $1.15 \times 10^4$ |
| 8 | BHPE/BPA 75   25 | 1.00 | T | 155 | $2.3 \times 10^4$ |
| 9 | BHPE/BPA 50   50 | 0.50 | T | — | $9.5 \times 10^2$ |
| 10 | BHPE/BPA 25   75 | — | T | 170 | $4.5 \times 10^4$ |
| 11 | BPA | 0.60 | T | 180 | — |
| 12 | BPA | 0.62 | T | — | $1.85 \times 10^4$ |
| 13 | BPA | 0.98 | T | — | $6.2 \times 10^4$ |
| 14 | BPA | 0.70 | T | 180 | — |
| 15 | BHPM | — | I | — | — |
| 16 | BHPP | 0.84 | T | 110 | — |

BHPE - 1,2-bis(4-hydroxyphenyl)ethane
BPA - 2,2-bis(4-hydroxyphenyl)propane (bisphenol A)
BHPM - bis(4-hydroxyphenyl)methane
BPHH - 1,3-bis(4-hydroxyphenyl)propane
T - tractable
I - intractable

EXAMPLE 2
PREPARATION OF POLY(1,2-BIS(4-HYDROXYPHENYL)ETHANE ISOPHTHALATE

A similar reaction is carried out under the same conditions and with the reactants and equipment described in Example 1 except that after the initial three hour period the temperature is raised to 275° C. and the pressure is reduced to 125 mm. for 30 minutes. Thereafter, the temperature is raised to 290° C. during the final period at high vacuum of 0.1 to 0.2 mm. The resultant polymer demonstrates an inherent viscosity of 0.83 and is crystalline and a clear light yellow in color.

EXAMPLES 3 to 16

Examples 3 to 16 are carried out by reacting mixtures of diphenol diacetates and isophthalic acid by the method of Example 1, with adjustment in the temperature and heating cycle appropriate for the rheology and morphology of the particular polyester.

EXAMPLES 17 to 23

A series of polyesters is prepared by the method of Example 2 with adjustment in the reaction temperature and heating cycle appropriate for the rheology and morphology of the particular polyester.

In a comparison of the polyesters, the flame resistance is rated by the Limiting Oxygen Index. In Table 2 values for the Limiting Oxygen Index are set forth and compared to those LOI values for such other polyesters as polyethylene terephthalate, BPA isophthalate and BPA oxydibenzoate, a polycarbonate and a polysulfone. The Limiting Oxygen Index values are determined both on 62.5 mil (1.56 mm.) slabs and on 8 mil (0.2 mm.) films reinforced with a glass scrim weighing 14 grams per square meter. The data demonstrate the superior flame resistance of the BHPE polyesters compared with several other polyesters and engineering thermoplastics.

TABLE 2
FLAME RESISTANCE OF POLYMERS (LIMITING OXYGEN INDEX)

| | COMPOSITION | | | LIMITING OXYGEN INDEX | |
|---|---|---|---|---|---|
| Example | Diphenol, mol ratio | Diacid, mol ratio | Inherent Viscosity | Unsupported | Reinforced With Glass |
| 17 | 100 BHPE | 100 I | 0.85 | 33 | 35 |
| 18 | 100 BHPE | 100 I | 0.78 | 34 | 34.5 |
| 19 | 98 BHPE/2 BPA | 100 I | — | 34 | Not Run |
| 20 | 95 BHPE/5 BPA | 100 I | — | 34 | Not Run |
| 21 | 100 BHPE | 67 I/33 N | — | 33 | Not Run |
| 22 | 100 BPA | 100 I | 0.98 | 27 | 24 |
| 23 | 100 BPA | 100 O | — | Not Run | 24 |
| | Polycarbonate | | — | 25.5 | 22 |
| | PET | | — | 21 | 20.5 |

TABLE 2-continued
FLAME RESISTANCE OF POLYMERS (LIMITING OXYGEN INDEX)

| | COMPOSITION | | | LIMITING OXYGEN INDEX | |
|---|---|---|---|---|---|
| Example | Diphenol, mol ratio | Diacid, mol ratio | Inherent Viscosity | Unsupported | Reinforced With Glass |
| | Polysulfone | | — | 27.5 | 24 |

I - isophthalic acid
N - 2,6-naphthalene dicarboxylic acid
O - oxydibenzoic acid
Polycarbonate - Lexan Polycarbonate General Purpose Grade supplied by General Electric Company
PET - Polyethylene Terephthalate (high molecular weight flake polyester supplied by Goodyear Tire & Rubber Company
Polysulfone - Udel General Purpose Grade supplied by Union Carbide Corporation

UL-94 TEST

In Table 3 data obtained with the UL-94 test are set forth and show the superior flame resistance of polyesters of 1,2-bis(hydroxyphenyl)ethane particularly in thin sections (Examples 3, 6, 7, 8 and 24) in comparison with polyester of 1,3-bis(4-hydroxyphenyl)propane (Example 16) and polyesters containing a substantial proportion of bisphenol A (Examples 9, 10, 11 and 14).

rheology and morphology of the particular polyester. In Example 31, 0.5 percent by weight of the titanium dioxide catalyst is used. In Examples 32-35, the diacid charge includes the indicated mol percentages of other diacids in admixture with isophthalic acid, including terephthalic acid, 2,6-naphthalene dicarboxylic acid and bis(4-carboxyphenyl)ether, (oxydibenzoic acid). In Example 38, the polyisophthalate of a mixture of 90 mol percent 1,2-bis(4-hydroxyphenyl)ethane and 10 mol percent bis(4-hydroxyphenyl)sulfide is prepared. The

TABLE 3
UL-94 TEST DATA FOR POLYESTERS

| | COMPOSITION | | Inherent | Sample Thickness | UL-94 | AFOT | AAGT |
|---|---|---|---|---|---|---|---|
| Example | Diphenol, mol ratio | Diacid, mol ratio | Viscosity | (cm) | Rating | sec. | sec. |
| 3 | 100 BHPE | 100 I | 0.96 | 0.119 | V-O | 2.1 | 8.4 |
| | | | | 0.084 | V-O | 3.1 | 3.0 |
| | | | | 0.084 | V-1 | 3.8 | 21.0 |
| 6 | 100 BHPE | 100 I | 0.53 | 0.084 | V-1 | 3.6 | >30 |
| 7 | 90 BHPE/10 BPA | 100 I | 0.94 | 0.119 | V-O | 1.8 | 6.0 |
| | | | | 0.084 | V-O | 2.9 | 12.0 |
| | | | | 0.084 | V-1 | 2.2 | 19.3 |
| 8 | 75 BHPE/25 BPA | 100 I | 1.00 | 0.158 | V-1 | 1.7 | 26.0 |
| 9 | 50 BHPE/50 BPA | 100 I | 0.53 | 0.158 | Fails | 40 | — |
| 10 | 25 BHPE/75 BPA | 100 I | — | 0.158 | Fails | — | — |
| 11 | 100 BPA | 100 I | 0.60 | 0.304 | V-O | 2.6 | 17 |
| | | | | 0.188 | Fails | — | — |
| 14 | 100 BPA | 100 I | 0.70 | 0.158 | Fails | — | — |
| 16 | 100 BHPP | 100 I | 0.84 | 0.282 | Fails | 4.9 | — |
| | | | | 0.170 | Fails | >30 | — |
| 24 | 100 BHPE | 97 I/3 A | 0.72 | 0.158 | V-1 | 2.0 | 19 |
| | | | | 0.079 | V-O | 2.75 | 28 |

A - azelaic acid
AFOT - average flame out time
AAGT - average after-glow time

EXAMPLES 25 to 29

A series of polyester combinations of 1,2-bis(4-hydroxyphenyl)ethane and admixtures of isophthalac and 5-t-butyl-isophthalic acids are prepared by the procedure of Example 2 and evaluated in the UL-94 test. The data show that a V-O rating is obtained with polyester samples of approximately 0.08 cm. thickness.

inherent viscosities, physical appearance, glass transition temperatures and melting points are set out in Table 5. The data show that polyester combinations containing high levels of 1,2-bis(hydroxyphenyl)ethane and acids such as isophthalic acid are opaque and exhibit crystalline melting points below 300° C. (Examples 29 - 38, 10, 25, 26) while in contrast, polyester combinations containing substantial amounts of other diphenols (Ex-

TABLE 4
COPOLYMERS OF 1,2-BIS(4-HYDROXYPHENYL)ETHANE, ISOPHTHALIC ACID AND T-BUTYL-ISOPHTHALIC ACID

| Example | ISOPHTHALIC:5-t-BUTYL ISOPHTHALIC mol ratio | | INHERENT VISCOSITY | UL-94 RATING Sample Thickness 0.079 cm. |
|---|---|---|---|---|
| 25 | 85 | 15 | 0.86 | V-O |
| 26 | 80 | 20 | 0.77 | V-O |
| 27 | 75 | 25 | 1.02 | V-O |
| 28 | 75 | 25 | 0.82 | — |

EXAMPLES 29 to 41

Additional polyester examples are prepared in the manner set forth in Example 2 with adjustment in reaction temperature and heating cycle appropriate for the amples 9, 10, 15, 16, 39 – 41) and polyester combinations containing substantial amounts of substituted acids such as 5-t-butyl-isophthalic acid (Examples 27, 28) are amorphous or intractable.

TABLE 5
MORPHOLOGY OF POLYESTERS

| EXAMPLE | COMPOSITION DIPHENOL, MOL RATIO | DIACID, MOL RATIO | INHERENT VISCOSITY | PHYSICAL APPEARANCE | $T_g$ °C. | $T_m$ °C. |
|---|---|---|---|---|---|---|
| 29 | 100 BHPE | 100 I | 1.01 | opaque | 154 | 289 |
| 30 | 100 BHPE | 100 I | 0.81 | opaque | — | — |
| 31 | 100 BHPE | 100 I | 1.02 | opaque | — | — |
| 32 | 100 BHPE | 90 I, 10 T | 0.88 | opaque | 154 | 255 |
| 33 | 100 BHPE | 93 I, 7 N | 0.86 | opaque | — | — |
| 34 | 100 BHPE | 90 I, 10 O | 0.93 | opaque | — | — |
| 35 | 100 BHPE | 67 I, 33 N | — | opaque | — | — |
| 36 | 98 BHPE, 2 BPA | 100 I | — | opaque | — | — |
| 37 | 95 BHPE, 5 BPA | 100 I | — | opaque | — | — |
| 38 | 90 BHPE, 10 BHPS | 100 I | 1.10 | opaque | — | — |
| 7 | 90 BHPE, 10 BPA | 100 I | 0.94 | opaque | — | — |
| 25 | 100 BHPE | 85 I, 15 BI | 0.86 | opaque | 150 | — |
| 26 | 100 BHPE | 80 I, 20 BI | 0.77 | opaque | 150 | 262 |
| 27 | 100 BHPE | 75 I, 25 BI | 1.02 | transparent, amorphous | 150 | — |
| 28 | 100 BHPE | 75 I, 25 BI | 0.82 | transparent, amorphous heat crystallizable | 150 | 257 |
| 8 | 75 BHPE, 25 BPA | 100 I | 0.53 | transparent, amorphous | — | — |
| 9 | 50 BHPE, 50 BPA | 100 I | — | transparent, amorphous | — | — |
| 39 | 100 BPA | 100 I | 0.62 | transparent, amorphous | 180 | none observed |
| 40 | 50 BHPS, 50 BPA | 100 I | — | transparent, amorphous | 180 | none observed |
| 41 | 100 BPE | 100 I | 0.55 | transparent, amorphous | — | — |
| 15 | 100 BHPM | 100 I | 1.09 | intractable | none observed | none observed |
| 16 | 100 BHPP | 100 I | 0.84 | transparent, amorphous | 110 | none observed |

BHPE = 1,2-bis(4-hydroxyphenyl)ethane
BHPS = bis(4-hydroxyphenyl)sulfide
BPA = 2,2-bis(4-hydroxyphenyl)propane, bisphenol A
BPE = 1,1-bis(4-hydroxyphenyl)ethane
BHPM = bis(4-hydroxyphenyl)methane
BHPP = 1,3-bis(4-hydroxyphenyl)propane
I = isophthalic acid
T = terephthalic acid
N = 2,6-naphthalene dicarboxylic acid
O = oxydibenzoic acid, [bis(4-carboxyphenyl)ether]
BI = 5-t-butyl-isophthalic acid

TABLE 6
RATES OF CRYSTALLIZATION

| EXAMPLE | COMPOSITION DIPHENOL, MOL RATIO | DIACID, MOL RATIO | CRYSTALLIZATION TIME FOR 50% CRYSTALLIZATION, MINS. | RATE OF CRYSTALLIZATION MINS$^{-1}$ |
|---|---|---|---|---|
| 29 | 100 BHPE | 100 I | 0.39 | 2.56 |
| 30 | 100 BHPE | 100 I | 0.35 | 2.86 |
| 31 | 100 BHPE | 100 I | 1.01 | 0.99 |
| 32 | 100 BHPE | 90 I, 10 T | 1.37 | 0.72 |
| 33 | 100 BHPE | 93 I, 7 N | 1.01 | 0.99 |
| 34 | 100 BHPE | 90 I, 10 O | 0.39 | 2.56 |
| 38 | 90 BHPE, 10 BHPS | 100 I | 0.47 | 2.11 |
| 39 | 100 BPA | 100 I | none observed | |
| 40 | 50 BHPS, 50 BPA | 100 I | none observed | |
| 15 | 100 BHPM | 100 I | none observed | |
| 16 | 100 BHPP | 100 I | none observed | |
| — | PTMT | | 0.89 | 1.12 |
| — | Nylon 6 | | 0.82 | 1.22 |

PTMT = Tenile Polyterephthalate, a polytetramethylene terephthalate supplied by Eastman Chemical Co.
Nylon 6 = Plaskon 8205, a poly(epsilon caprolactam) supplied by Allied Chemical Co.

RATE OF CRYSTALLIZATION OF POLYESTERS OF 1,2-BIS(HYDROXYPHENYL)ETHANE

The rate of crystallization of a series of polyesters of 1,2-bis(hydroxyphenyl)ethane is determined by the method described herein using a Perkin-Elmer Differential Scanning Calorimeter Model DSC-1B. The data are presented in Table 6 and show that crystallization rates superior to those of polytetramethylene terephthalate and nylon 6 can be achieved and that minor amounts of a diphenol such as bis(4-hydroxyphenyl)sulfide in admixture with 1,2-bis(4-hydroxyphenyl)ethane does not appreciably affect the crystallization rate of polyesters prepared therefrom.

SOLVENT RESISTANCE AND STRESS CRACKING RESISTANCE

A comparison of solvent resistance and stress cracking resistance of crystalline polyisophthalates of 1,2-bis(4-hydroxyphenyl)ethane and amorphous polyisophthalates of 2,2-bis(4-hydroxyphenyl)propane is made in Tables 7 and 8.

TABLE 7
SOLVENT RESISTANCE OF POLY(ISOPHTHALATES)

| | COMPOSITION | | INHERENT | SOLVENT ABSORPTION (WEIGHT PERCENT) | | | | | | | | |
|---|---|---|---|---|---|---|---|---|---|---|---|---|
| | | | | 1 day | | | 4 days | | | 16 days | | |
| EXAMPLE | DIPHENOL, MOL RATIO | DIACID, MOL RATIO | VISCOSITY | HEX | TCE | MEK | HEX | TCE | MEK | HEX | TCE | MEK |
| 17 | 100 BHPE | 100 I | 0.80 | 0 | 1 | 1 | 0 | 2 | 0 | 0 | 5 | 2 |
| 18 | 100 BHPE | 100 I | 0.78 | 0 | 1 | 1 | 0 | 1 | 0 | 0 | 3 | 0 |
| 35 | 100 BHPE | 67 I, 33 N | — | 0 | 0 | 0 | 0 | 0 | 0 | 0 | 0 | 0 |
| 36 | 98 BHPE, 2 BPA | 100 I | — | 0 | 1 | 1 | 0 | 2 | 1 | 0 | 6 | 2 |
| 37 | 95 BHPE, 5 BPA | 100 I | — | 0 | 2 | 1 | 0 | 2 | 1 | 0 | 7 | 3 |
| 42 | 100 BPA | 100 I | 0.98 | 0 | 120 | 26 | 0 | 112 | 25 | 0 | 106 | 25 |
| 43 | 100 BPA | 100 I | 0.51 | 0 | 78 | 24 | 0 | 83 | 23 | 0 | 83 | 23 |

HEX = Hexane
TCE = sym-tetrachloroethane
MEK = methyl ethyl ketone

TABLE 8
STRESS-CRACKING RESISTANCE OF POLY(ISOPHTHALATES)

| | STRESS CRACKING | | | |
|---|---|---|---|---|
| EXAMPLE | HEXANE | TOLUENE | MEK | TCE |
| 17 | Pass | Pass | Pass | Fail |
| 35 | Pass | Pass | Pass | Fail |
| 36 | Pass | Pass | Pass | Failed/ 2 days |
| 37 | Pass | Pass | Pass | Fail |
| 42 | Crazed | Fail | Fail | Fail |

From the figures given above in Tables 7 and 8, it will be apparent that the crystalline polyesters of the 1,2-bis(4-hydroxyphenyl)ethane are much better adapted than similar amorphous thermoplastic polyesters such as poly[2,2-bis(4-hydroxyphenyl)propane isophthalate] to perform satisfactorily under conditions in which they are exposed to organic solvents.

What is claimed is:

1. A polyester consisting essentially of the condensation product of an aromatic dicarboxylic acid and a diphenol; wherein the aromatic dicarboxylic acid comprises at least one acid selected from the group consisting of isophthalic acid, terephthalic acid, 5-alkylisophthalic acid, wherein the alkyl radical contains from 1 to 6 carbon atoms, 3,3'-, 3,4'- and 4,4'-bibenzoic acids, 1,3-, 1,4-, 1,5-, 1,6-, 1,7-, 1,8-, 2,6- and 2,7-naphthalene dicarboxylic acids, and acids represented by the formula:

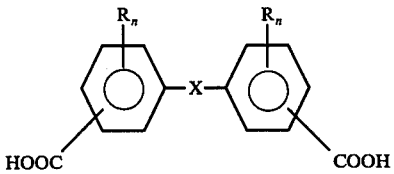

wherein the carboxyl groups are in the 3- or 4- positions, X is O, S, $SO_2$, C=O, $CH_2$, $CH_2CH_2$, $CH(CH_3)$ or $C(CH_3)_2$, R is H or a $C_1$ to $C_6$ alkyl radical, R groups ortho to a carboxyl are small enough to permit esterification, R substituents ortho to X are limited to one ring and $n = 0$ to 2; wherein the diphenol comprises from about 60 to 100 mol percent of a 1,2-bis(hydroxyphenyl)ethane in which the hydroxyl groups are in the 3- or 4- positions and from about 40 to 0 mol percent of a diphenol selected from the group consisting of resorcinol, hydroquinone, 3,3'-, 3,4'- and 4,4'-diphenols, 1,3-, 1,4-, 1,5-, 1,6-, 1,7-, 1,8-, 2,6- and 2,7-dihydroxynaphthalenes, and diphenols represented by the formula:

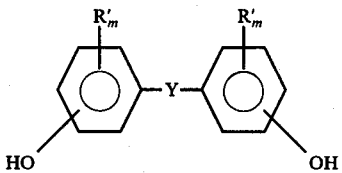

wherein the hydroxyl groups are in the 3- or 4- positions, Y is O, S, $SO_2$, C=O, $CH_2$, $CH(CH_3)$, $C(CH_3)_2$ or $(CH_2)_3$, R' is H or a $C_1$ to $C_6$ alkyl radical, R' substituents ortho to Y are limited to one ring, R' substituents ortho to hydroxyl are small enough to permit esterification and $m = 0$ to 4; and wherein the melt viscosity of the polyester at 320° C. determined at a shear rate of 100 sec.$^{-1}$ with a capillary rheometer is less than about $10^5$ poise.

2. The polyester of claim 1 wherein the aromatic dicarboxylic acid comprises at least one acid selected from the group consisting of isophthalic acid, 5-t-butylisophthalic acid, terephthalic acid, bis(4-carboxyphenyl)ether, bis(4-carboxyphenyl)sulfide, bis(4-carboxyphenyl)sulfone, bis(4-carboxyphenyl)methane, 1,2-bis(4-carboxyphenyl)ethane, and 2,2-bis(4-carboxyphenyl)propane.

3. The polyester of claim 2 wherein the diphenol comprises the 1,2-bis(hydroxyphenyl)ethane and at least one diphenol selected from the group consisting of bis(4-hydroxyphenyl)methane, 2,2-bis(4-hydroxyphenyl)propane, bis(4-hydroxyphenyl)ether, bis(4-hydroxyphenyl)sulfide and bis(4-hydroxyphenyl)sulfone.

4. The polyester of claim 1 wherein the $T_g$ is greater than about 100° C.

5. The polyester of claim 1 wherein the inherent viscosity of 30° C. determined at a concentration of 0.5 grams polyester per 100 ml. solution in solvent mixture of 60 parts by weight of phenol and 40 parts by weight of sym-tetrachloroethane, is at least about 0.3.

6. The polyester of claim 1 wherein the flame resistance rating of a sheet of polyester of 0.08 cm. thickness is at least V-I.

7. A polyester consisting essentially of the condensation product of a diphenol and an aromatic dicarboxylic acid wherein the diphenol contains at least about 75 mol percent of a 1,2-bis(hydroxyphenyl) ethane in which the hydroxyl groups are in the 3- or 4- positions and the remainder comprises at least one diphenol selected from the group consisting of bis(4-hydroxyphenyl)methane, 2,2-bis(4-hydroxyphenyl)propane, bis(4-hydroxyphenyl)ether, bis(4-hydroxyphenyl)sulfide, and bis(4-hydroxyphenyl)sulfone; wherein the aromatic dicarboxylic acid comprises at least one acid selected from the group consisting of isophthalic acid, 5-t-butylisophthalic acid, terephthalic acid, bis(4-carboxyphenyl)ether, bis(4-carboxyphenyl)sulfide, bis(4-carboxyphenyl)sulfone, bis(4-carboxyphenyl)methane, 1,2-bis(4-carboxyphenyl)ethane and 2,2-bis(4-carboxyphenyl)propane; wherein the melt viscosity of the polyester at 320° C. determined at a shear rate of 100 sec.$^{-1}$ with a capillary rheometer is less than about $10^5$ poise; wherein the $T_g$ of the polyester is greater than about 100° C.; wherein the inherent viscosity of the polyester at 30° C., determined at a concentration of 0.5 gram polyester per 100 ml. solution, in a solvent mixture of 60 parts by weight of phenol and 40 parts by weight of sym-tetrachloroethane, is at least about 0.5; and wherein the flame resistance rating of a sheet of polyester of 0.08 cm. thickness is at least V-1.

8. A polyester consisting essentially of the condensation product of a diphenol and at least one aromatic dicarboxylic acid selected from the group consisting of isophthalic acid and t-butyl-isophthalic acid; wherein the diphenol comprises at least about 60 mol percent 1,2-bis(4-hydroxyphenyl)ethane and the remainder comprises at least one diphenol selected from the group consisting of 1,2-bis(3-hydroxyphenyl)ethane, bis(4-hydroxyphenyl)methane and 2,2-bis(4-hydroxyphenyl)propane; wherein the melt viscosity of the polyester at 320° C. determined with a capillary rheometer at a shear rate of 100 sec.$^{-1}$ is less than about $10^5$ poise; wherein the $T_g$ of the polyester is greater than about 100° C. and wherein the inherent viscosity of the polyester at 30° C. determined at a concentration of 0.5 gram polyester per 100 ml. solution, in a solvent mixture of 60 parts by weight of phenol and 40 parts by weight of sym-tetrachloroethane, is at least about 0.5.

9. A molding powder comprising the polyester of claim 1.

10. A molding powder comprising the polyester of claim 3.

11. A molding powder comprising the polyester of claim 7.

12. A molding powder comprising the polyester of claim 8.

13. A shaped article formed from the molding powder of claim 9.

14. A shaped article formed from the molding powder of claim 10.

15. A shaped article formed from the molding powder of claim 11.

16. A shaped article formed from the molding powder of claim 12.

17. A polyester of melting point less than 350° C. consisting essentially of the condensation product of an aromatic dicarboxylic acid and a diphenol; wherein the aromatic dicarboxylic acid comprises at least one acid selected from the group consisting of isophthalic acid, terephthalic acid, 3,3'-, 3,4'- and 4,4'-bibenzoic acids, 1,3-, 1,4-, 1,5-, 1,6-, 1,7-, 1,8-, 2,6- and 2,7-naphthalene dicarboxylic acids and acids represented by the formula:

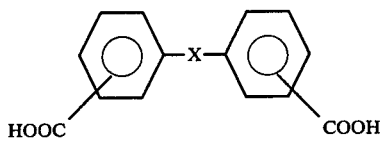

wherein the carboxyl groups are in the 3- or 4- positions, and X is O, S, SO$_2$, C=O, CH$_2$ or CH$_2$CH$_2$; and wherein the diphenol comprises about 75 to 100 mol percent 1,2-bis(4-hydroxyphenyl)ethane and about 25 to 0 mol percent of at least one diphenol selected from the group consisting of resorcinol, hydroquinone, 3,3'-, 3,4'- and 4,4'-diphenols, 1,3-, 1,4-, 1,5-, 1,6-, 1,7-, 1,8-, 2,6- and 2,7-dihydroxynaphthalenes, 1-(3-hydroxyphenyl)2-(4-hydroxyphenyl)ethane, 1,2-bis(3-hydroxyphenyl)ethane and diphenols represented by the formula:

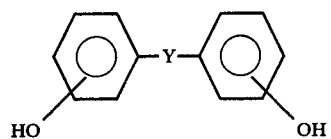

wherein the hydroxyl groups are in the 3- or 4- positions and Y is O, S, SO$_2$, C=O, CH$_2$ or C(CH$_3$)$_2$.

18. The polyester of claim 17 wherein the aromatic dicarboxylic acid comprises at least one acid selected from the group consisting of isophthalic acid, terephthalic acid, bis(4-carboxyphenyl)ether, bis(4-carboxyphenyl)sulfide, bis(4-carboxyphenyl)sulfone, bis(4-carboxyphenyl)methane and 1,2-bis(4-carboxyphenyl)ethane and wherein the diphenol comprises about 75 to 100 mol percent 1,2-bis(4-hydroxyphenyl)ethane and about 25 to 0 mol percent of at least one diphenol selected from the group consisting of bis(4-hydroxyphenyl)methane, 2,2-bis(4-hydroxyphenyl)propane, bis(4-hydroxyphenyl)ether, bis(4-hydroxyphenyl)sulfide and bis(4-hydroxyphenyl)sulfone.

19. The polyester of claim 17 wherein the $T_g$ is greater than about 100° C.

20. The polyester of claim 17 wherein the inherent viscosity at 30° C. determined at a concentration of 0.5 gram polyester per 100 ml. solution in a solvent mixture of 60 parts by weight of phenol and 40 parts by weight of sym-tetrachloroethane, is at least about 0.3.

21. The polyester of claim 17 wherein the crystallization rate is greater than about 0.2 min$^{-1}$.

22. A polyester of melting point less than about 350° C. consisting essentially of the condensation product of at least one aromatic dicarboxylic acid selected from the group consisting of isophthalic acid, terephthalic acid, bis(4-carboxyphenyl)ether, bis(4-carboxyphenyl)sulfide, bis(4-carboxyphenyl)sulfone, bis(4-carboxyphenyl)methane and 1,2-bis(4-carboxyphenyl)ethane and at least one diphenol selected from the group consisting of 1,2-bis(4-hydroxyphenyl)ethane, 1,2-bis(3-hydroxyphenyl)ethane, 1-(3-hydroxyphenyl)-2-(4-hydroxyphenyl)ethane, bis(4-hydroxyphenyl)methane, bis(4-hydroxyphenyl)ether, bis(4-hydroxyphenyl)sulfide and bis(4-hydroxyphenyl)sulfone; wherein the diphenol comprises at least about 75 mol percent 1,2-bis(4-hydroxyphenyl)ethane; wherein the $T_g$ of the polyester is greater than about 100° C.; wherein the inherent viscosity of the polyester at 30° C. determined at a concentration of 0.5 gram polyester per 100 ml. solution in a solvent mixture of 60 parts by weight of phenol and 40 parts by weight of sym-tetrachloroethane, is at least about 0.5; and wherein the crystallization rate of the polyester is greater than about 0.5 min.$^{-1}$.

23. A polyester of melting point less than about 350° C. consisting essentially of the condensation product of at least one aromatic dicarboxylic acid selected from the group consisting of isophthalic acid, terephthalic acid, bis(4-carboxyphenyl)ether, bis(4-carboxyphenyl)sulfide, bis(4-carboxyphenyl)sulfone, bis(4-carboxyphenyl)methane and 1,2-bis(4-carboxyphenyl)ethane and at least one diphenol selected from the group consisting of 1,2-bis(4-hydroxyphenyl)ethane, 1,2-bis(3-hydroxyphenyl)ethane, 1-(3-hydroxyphenyl)-2-(4-hydroxyphenyl)ethane, bis(4-hydroxyphenyl)methane, bis(4-hydroxyphenyl)ether, bis(4-hydroxyphenyl)sulfide and bis(4-hydroxyphenyl)sulfone; wherein the diphenol comprises at least about 90 mol percent 1,2-bis(4-hydroxyphenyl)ethane; wherein the $T_g$ of the polyester is greater than about 100° C., wherein the inherent viscosity of the polyester at 30° C. determined at a concentration of 0.5 gram polyester per 100 ml. solution in a solvent mixture of 60 parts by weight of phenol and 40 parts by weight of sym-tetrachloroethane, is at least about 0.5; and wherein the crystallization rate of the polyester is greater than about 0.5 $min^{-1}$.

24. A polyester consisting essentially of the condensation product of an aromatic dicarboxylic acid and a diphenol, wherein the aromatic dicarboxylic acid comprises at least about 67 mol percent of isophthalic acid and wherein the diphenol comprises at least about 90 mol percent 1,2-bis(4-hydroxyphenyl)ethane; wherein the $T_g$ of the polyester is greater than about 100° C.; wherein the inherent viscosity at 30° C. determined at a concentration of 0.5 gram polyester per 100 ml. solution in a solvent mixture of 60 parts by weight of phenol and 40 parts by weight of sym-tetrachloroethane, is at least about 0.3; and wherein the crystallization rate of the polyester is greater than about 0.5 $min^{-1}$.

25. The polyester of claim 24, wherein the inherent viscosity is at least about 0.5.

26. A molding powder comprising the polyester of claim 17.

27. A molding powder comprising the polyester of claim 18.

28. A molding powder comprising the polyester of claim 22.

29. A molding powder comprising the polyester of claim 23.

30. A molding powder comprising the polyester of claim 25.

31. A shaped article formed from the molding powder of claim 26.

32. A shaped article formed from the molding powder of claim 27.

33. A shaped article formed from the molding powder of claim 28.

34. A shaped article formed from the molding powder of claim 29.

35. A shaped article formed from the molding powder of claim 30.

36. A polyester consisting essentially of the condensation product of an aromatic dicarboxylic acid and a diphenol, wherein the diphenol comprises at least about 60 mol percent of a 1,2-bis(hydroxyphenyl)ethane in which the hydroxyl groups are in the 3- or 4- positions, and wherein the melt viscosity at 320° C. determined at a shear rate of 100 $sec.^{-1}$ with a capillary rheometer, is less than about $10^5$ poise.

37. The polyisophthalate of 1,2-bis(4-hydroxyphenyl)ethane.

* * * * *